Jan. 6, 1959  F. B. SHAWVER  2,867,449
HAND CART ADAPTED FOR USE WITH INTERCHANGEABLE LOAD CARRIERS
Filed Oct. 14, 1957  2 Sheets-Sheet 1
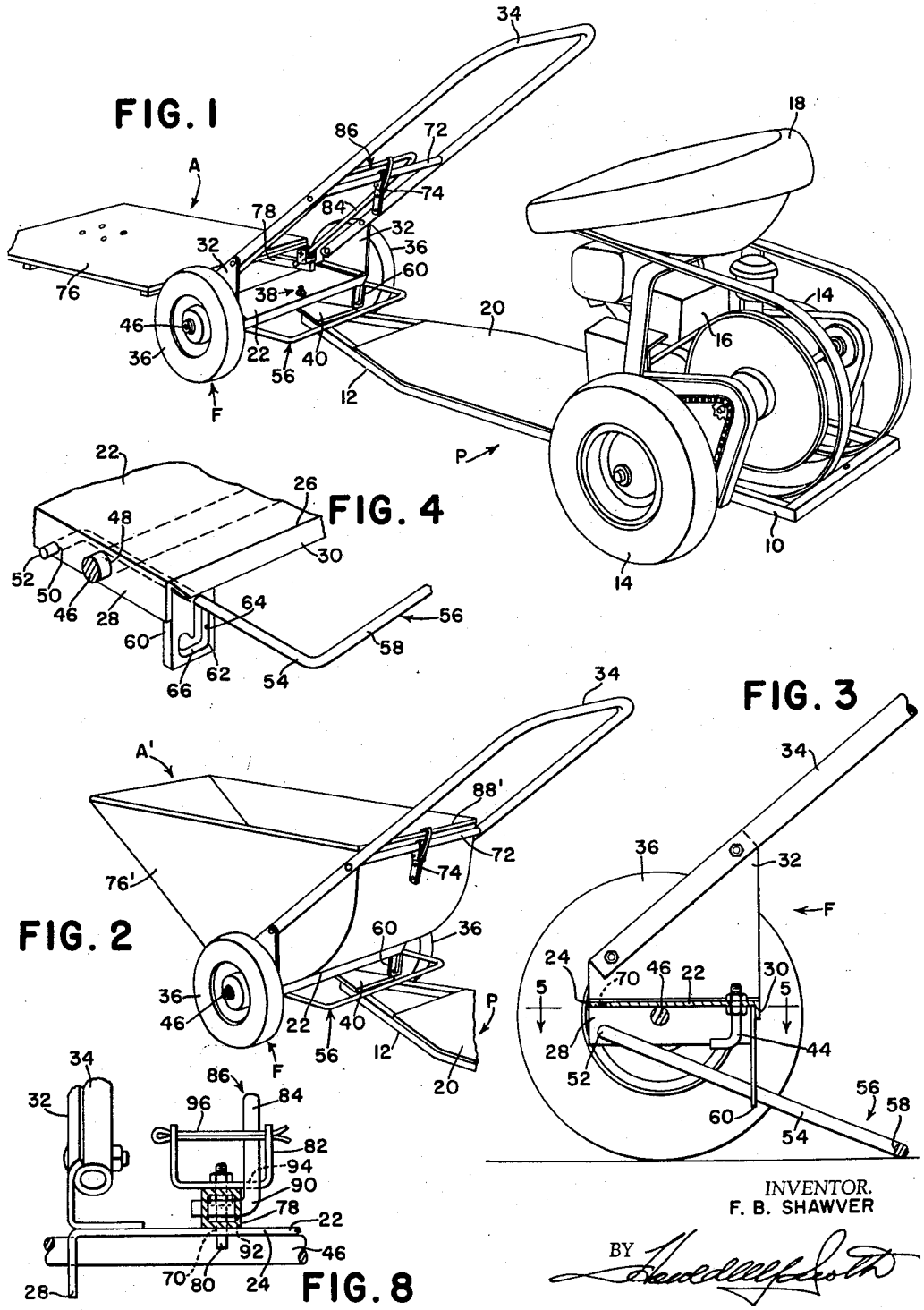
INVENTOR.
F. B. SHAWVER
BY
ATTORNEY Jan. 6, 1959         F. B. SHAWVER         2,867,449
HAND CART ADAPTED FOR USE WITH INTERCHANGEABLE LOAD CARRIERS
Filed Oct. 14, 1957                    2 Sheets-Sheet 2
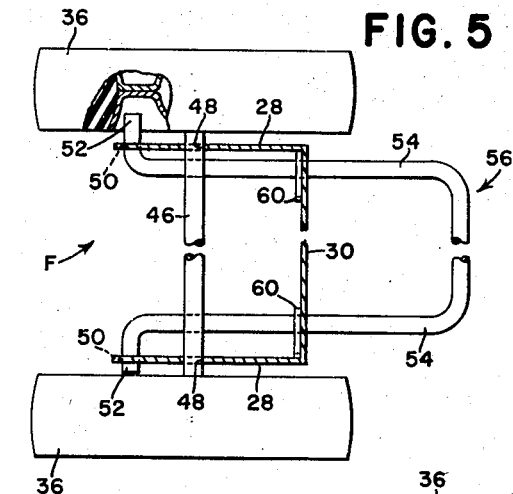
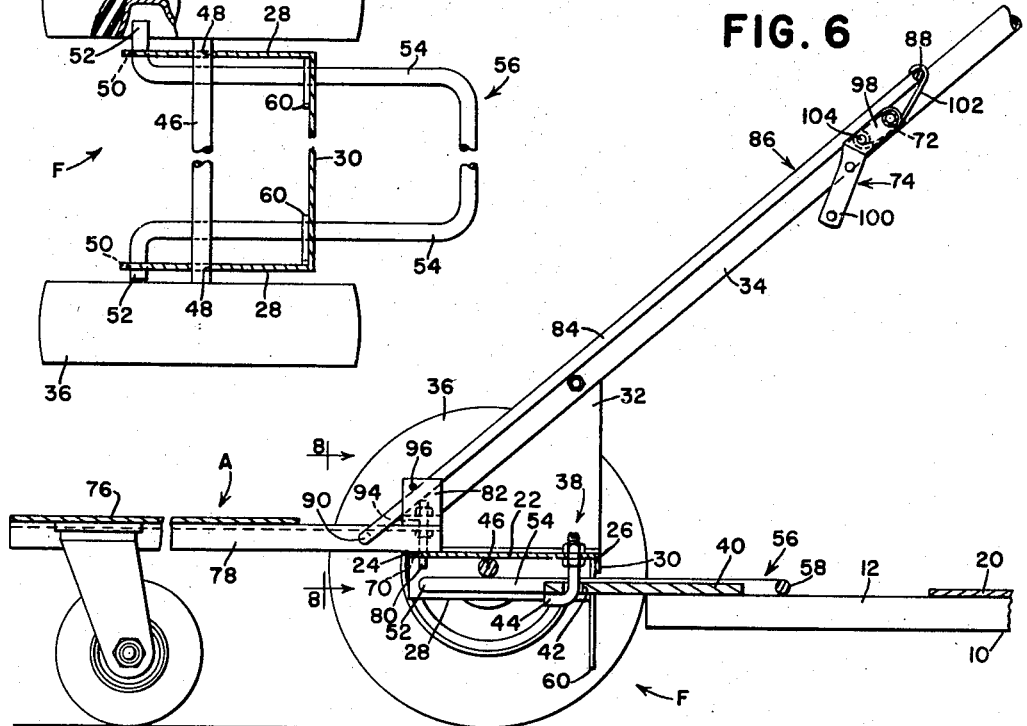
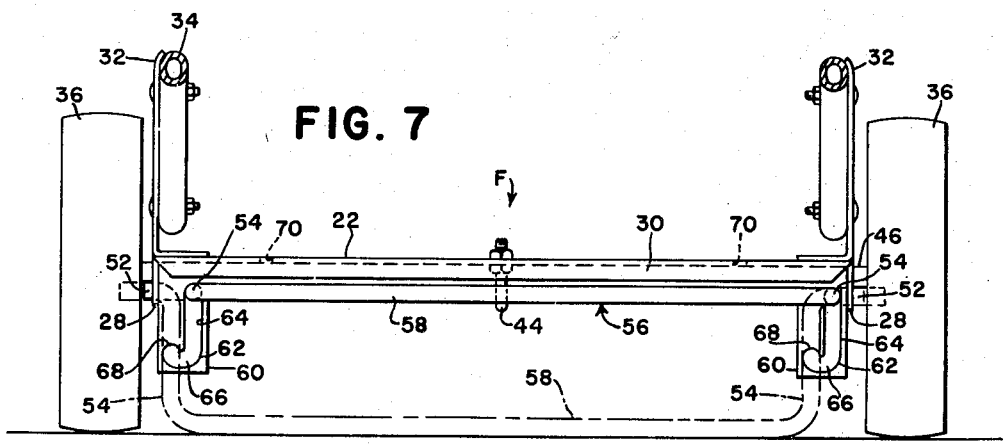
INVENTOR.
F. B. SHAWVER
BY
ATTORNEY United States Patent Office 2,867,449
Patented Jan. 6, 1959

2,867,449

HAND CART ADAPTED FOR USE WITH INTERCHANGEABLE LOAD CARRIERS

Francis B. Shawver, Davenport, Iowa

Application October 14, 1957, Serial No. 689,811

6 Claims. (Cl. 280—47.18)

This invention relates to a vehicle and more particularly to a vehicular unit especially useful by itself or in association with a propelling unit, and finds particular utility in a vehicular train of relatively small size useful in coping with the care of lawns, gardens and the like as well as in the handling and transporting of materials in plants, shops, etc.

A typical vehicular train of the general character referred to will comprise a rear power unit including accommodations and controls for a rider and a selection of detachable front units, depending upon the work to be performed. For example, the front unit could be a lawn mower, wheeled snow blade, tiller, cart, lawn aerator or the like. In any case, the interconnection of the front and rear units affords a small but adequately powered stable composite vehicle steerable about the pivotal interconnection between the units. In addition to front units that have individual functional mechanisms (lawn mowers, for example), it is desirable to provide a simple wheeled unit for load-carrying purposes and to which a number of load-carrying or load-handling auxiliaries may be removably attached, such as a pallet, a receptacle, a snow blade, a fertilizer distributor and the like, thus enabling the use of a common front wheeled unit which is useful with such auxiliaries as already described and which, moreover, is useful without such auxiliaries so that the unit and the rear unit provide a powered composite vehicle useful for towing purposes. Besides this, the front unit may be detached from the power unit and used manually as a wheeled truck which may be converted to a cart, snow plow, etc.

In accordance with the foregoing it is a principal object of the invention to provide a simple sturdy wheeled unit or truck accomplishing the above results. It is a feature of the invention to provide novel means for effecting the mounting and dismounting of any one of a wide variety of auxiliaries. Further objects reside in an improved parking stand, the use of the stand in retracted position to contribute to the support of the front unit on the power unit, improved locking means for use in the mounting and dismounting of the auxiliaries, and such other objects and features, singly and in combination, as will appear as the disclosure progresses in connection with the accompanying sheets of drawings, the several figures of which are described below.

Figure 1 is a perspective of an assembled train with one form of auxiliary attachment on the front unit.

Figure 2 is a fragmentary perspective showing another form of auxiliary on the front unit.

Figure 3 is an enlarged view, partly in section, of the wheeled front unit with portions of the handle means broken away.

Figure 4 is an enlarged fragmentary perspective showing some of the details of the parking stand.

Figure 5 is a section on the line 5—5 of Figure 3.

Figure 6 is a view similar to Figure 3, but showing more of the structure and also showing parts of the rear unit and the auxiliary of Figure 1.

Figure 7 is a rear view, partly in section, of Figure 3 but showing the parking stand up in full lines, and down in broken lines.

Figure 8 is an enlarged fragmentary section on the line 8—8 of Figure 6.

Reference will be had first to Figure 1 for an overall picture of what is involved. In this figure, a rear or power unit P is articulately connected to a front mobile unit F and the latter carries a detachable auxiliary element A, here a load-carrying means such as a pallet or platform. As will be clear from Figure 2, the pallet may be detached from the unit F and another form of auxiliary body A'—such as a receptacle—used in lieu thereof. A wide variety of auxiliaries is available and those shown are only representative. It will be subsequently brought out that the unit F is useful without any auxiliary body at all, either alone or attached to the power unit, and in the latter case the two units combine to afford a composite four-wheel vehicle.

The power unit comprises a main frame 10 having a forward extension serving as a reach 12 for connection to the unit F, or to any of a plurality of equivalent units not specifically important in the present case. The frame 10 is carried by a pair of drive wheels 14 which are driven by suitable drive means from a power source, here an internal combustion engine 16. An operator's seat 18 is located over a forward part of the engine and is convenient to a platform 20 on the frame reach 12.

The front or propelled unit F, which by itself is a two-wheeled vehicle or truck, comprises a support frame in the form of a horizontal transverse main frame plate 22 having transverse front and rear portions or edges 24 and 26 respectively and opposite depending side members preferably in the form of down-turned integral flanges 28. The rear edge 26 also has an integral transverse depending flange 30. Opposite upstanding side brackets 32 are rigidly secured to the plate 22 at its side edges by any suitable means and these brackets rigidly carry handle means 34 that extends upwardly and rearwardly to a convenient level for manual wheeling of the unit F on its wheels 36 or for convenient steering of the composite vehicle about an upright pivot included in a connection 38 between the rear of the unit F and the reach 12 of the power unit P. As shown, the terminal front end of the reach carries a plate 40 that is apertured at 42 to detachably receive a hook-shaped connector 44 on the rear of the front unit F. Connection of the two units is effected by rocking the front unit upwardly and forwardly and then downwardly and rearwardly relative to the rear unit to achieve the proper relationship between the hook 44 and aperture 42. Disconnection follows a reversal of the above.

The wheels 36 of the vehicle unit F are journaled respectively on the outer end portions of a transverse axle 46 that passes through a first set of transversely coaxial apertures 48 in the side flanges 28. The axle is located so that the intermediate portion of the plate bears at its undersurface on the top surface of the axle, adding strength and rigidity.

The side flanges 28 respectively have a second set of transversely coaxial apertures 50 which are located ahead of the axle and at a comparatively lower level than the axle. These apertures respectively pivotally and axially slidably receive pintle or pivot portions 52 formed as laterally outwardly bent portions of the terminal front ends of fore-and-aft legs 54 of a bail or support 56 having a rear transverse bight 58. The pintles 52 thus mount the bail for vertical swinging between a traveling position (Figures 1, 2 and 4; full lines, Figure 7) and a park position (Figure 3; broken lines, Figure 7).

Swinging of the bail between the two positions noted is effected manually and is guided or controlled by depending plate means made up of a pair of transverse depending plates or plate members 60 secured to the rear of the support frame 22 in transversely spaced relation. Each depending plate has an angular or J-shaped slot 62 affording an upright part 64 and a transverse lower part 66 (Figure 7). Each plate is rigidly secured at its upper edge portion to the rear plate flange 30 and is additionally rigidly secured at a portion of its outer side edge to the proximate side flange 28 (Figures 4 and 5).

The plates 60 are laterally inwardly, respectively, of the main frame side flanges 28, and the slots 62 are so arranged as to respectively receive the legs 54 of the bail 56. The upper or traveling position of the bail is limited or defined by the tops of the upright slot parts 64 so that the bail extends horizontally rearwardly to rest or ride on the proximate top surface of the power unit reach 12 (Figure 6), thus contributing to the inter-supporting relationship between the two units. In this position, the bight 58 of the bail traverses the reach as the composite vehicle is steered about the pivot afforded at 38, it being clear that this steering is accomplished via the handle means 34 by an operator seated or standing on the power unit P. This covers one significant function of the bail.

Another function of the bail is as a parking stand when the unit F is detached from the unit P (Figure 3), at which time the bail is depressed to the limit afforded by the length of the slots 62 so that the legs 54 of the bail are received respectively by the transverse slot parts 66. The pintles 52 of the bail are axially shiftably received in the respective side flange apertures 50 so that the bail may be bodily shifted laterally (here to the left, Figure 7), and the bail will be releasably locked in its lower or parking position. Each transverse slot portion 66 may be of hooked configuration at 68 to improve the lock on the parking position of the bail.

When the unit F is used as a manually propelled unit, the bail is swung to its upper position. Bias built into the bail, as by lateral distortion of one or both of the legs affords sufficient friction to retain the bail in its up position. Manipulation of the bail between its two positions may be readily effected by the user's foot. Because of the length of the bight 58 of the bail, it has important advantages over a single-leg type of stand in that, for example, it is not prone to sink into the ground. Since the stand is retractable to the traveling position described, it is out of the way during manual use of the unit.

For the purpose of detachably receiving any one of several auxiliary bodies such as those at A and A', the front unit F has lower front and upper rear mounting means, the former comprising a pair of laterally spaced openings 70 at the front edge 24 of the main plate 22 and the latter comprising a mounting element or transverse bar 72 across the handle means 34 and a lock device 74 of the over-center type. The auxiliary A includes a wheeled platform 76 having laterally spaced apart fore-and-aft frame members 78, each of which has at its rear end a rigid stud 80, these studs serving as lower attachment means and being spaced apart on the order of and downwardly receivable in the unit openings 70 (Figures 6 and 8). Each stud also secures a U-shaped clip 82 to the respective member 78 and these clips receive the lower front end portions of the legs 84 of a rear attachment means in the form of a supporting bail 86 having a bight 88 that affords an upper part cooperative with the lock means 74. Each leg 84 has its terminal end bent as a pintle 90 passing through an aperture 92 in the proximate member 78 (Figure 8), and each leg lies between the sides of the clip and bears against the front edge 94 of the clip, which edge serves as a fulcrum about which the associated leg 84 is stressed in bending as the bight 88 is squeezed into proximity to the transverse bar 72 of the handle means 34, after which the lock 74 is operated to its Figure 6 position to retain the bail. Retaining pins such as cotters 96 pass respectively through the legs or sides of the clips 82 to retain the bail 86 against forward pivoting about its pintles 90.

The over-center lock 74 includes a body member 98 pivoted on the transverse bar 72, a lever 100 rigid on the body member and a hook 102 pivoted to the lever at 104. As shown in Figure 6, the device 74, when locked, places the bail bight 88 and the pivot 104 ahead of or over the center established by the transverse bar 72. As already indicated, the bail 86 is stressed in bending over the fulcra 94, which not only adds to the effectiveness of the lock but creates a binding effect on the studs or pins 80 in the holes 70. Release of the bail requires only that the lever 100 be swung upwardly and forwardly and that the hook 102 be then lifted to clear the bail bight 88, after which the auxiliary A may be lifted enough to withdraw the studs 80 from the main plate holes 70.

The other representative auxiliary A' is just as easily mounted on and dismounted from the unit F. This auxiliary body has lower means (not shown) like those at 80 on the auixliary A, and further has an upper rear part 88', here the rear edge of a cart body or receptacle 76'. This part 88' is the equivalent of the bight 88 of the bail 86 of the auxiliary A and in like manner cooperates with the lock means 74.

As shown in Figure 5, the wheels 36 are dished or recessed to afford ample space for lateral shifting of the pintles 52 of the parking bail 56. This is but one of the several features of the simple, economical yet more than adequate structure shown. The unit F is flexible, lending itself to use alone, to use with a variety of auxiliaries and to use with the power unit F, both with and without auxiliaries or attachments. It is of simple yet sturdy construction and the fullest advantage is taken of compelling the parts to perform multiple functions. For example, the break lines in the plate 22 at which the side flanges 28 are formed are closely tangent to or even chords of the openings 48 through which the axle 46 extends, thus requiring the flanges to be slightly "sprung" to receive the axle and thereby affording the necessary grip on the axle to keep it from turning and from axial shifting.

In its broadest aspects, the invention is capable of assuming forms other than as disclosed, but these, as well as the attainment of objects other than those enumerated, are of course within the spirit and scope of the invention.

What is claimed is:

1. A mobile unit of the class described, comprising: a transverse horizontal main frame plate having opposite integral depending fore-and-aft side flanges and an integral depending transverse rear flange, said side flanges respectively having transversely coaxial first apertures and transversely coaxial second apertures ahead of the first apertures; an axle through the first apertures and having opposite ends laterally outwardly of the side flanges; wheels respectively on said axle outer ends; a pair of transverse depending plates at the rear of the main plate in transversely spaced apart relation respectively laterally inwardly of the wheels, each depending plate having an upper portion secured to the rear flange and an outer side portion secured to the respective side flange, each depending plate having therein an angular slot affording an upright part and a lower transverse part; a bail having a rear transverse bight rearwardly of the depending plates and a pair of fore-and-aft legs extending forwardly respectively through the aforesaid slots, below the axle and respectively laterally inwardly of the side flanges, each leg having its terminal front end portion turned laterally outwardly as a pintle loosely received in the respective second aperture of the side flange to mount the bail for swinging vertically within the limits of the upright parts of the slots, at least one of said legs being biased laterally to frictionally engage the respective depending plate in the upright part of its slot so as to tend to hold the bail in an upper position and said pintles being axially shiftable in their respective side flange apertures to enable transverse shifting of the bail when the legs thereof are alined with the transverse parts of said slots whereby to afford lock means for the bail when swung downwardly.

2. The invention defined in claim 1, including: handle means secured to the main frame plate and extending upwardly and rearwardly therefrom; means on the main frame plate for supporting an attachable body; and releasable lock means on the handle means for engaging such attachable body.

3. A mobile unit of the class described, comprising: a transverse horizontal main frame plate having opposite depending fore-and-aft side members, said side members respectively having transversely coaxial first apertures and transversely coaxial second apertures ahead of the first apertures; an axle through the first apertures and having opposite ends laterally outwardly of the side members; wheels respectively on said axle outer ends; a pair of transverse depending plates at the rear of and secured to the main plate in transversely spaced apart relation respectively laterally inwardly of the wheels, each depending plate having therein an angular slot affording an upright part and a lower transverse part; a bail having a rear transverse bight rearwardly of the depending plates and a pair of fore-and-aft legs extending forwardly respectively through the aforesaid slots, below the axle and respectively laterally inwardly of the side members, each leg having its terminal front end portion turned laterally outwardly as a pintle loosely received in the respective second aperture of the side member to mount the bail for swinging vertically within the limits of the upright parts of the slots, and said pintles being axially shiftable in their respective side member apertures to enable transverse shifting of the bail when the legs thereof are alined with the transverse parts of said slots whereby to afford lock means for the bail when swung downwardly; and means for releasably retaining the bail in an upper position.

4. A mobile unit of the class described, comprising: a transverse support frame having opposite depending fore-and-aft side members, said side members respectively having transversely coaxial apertures; wheels carrying the frame respectively adjacent to the side members; transverse depending plate means at the rear of the frame and secured thereto and having a pair of transversely spaced angular slots, each slot affording an upright part and a lower transverse part; a bail having a rear transverse bight rearwardly of the depending plate means and a pair of fore-and-aft legs extending forwardly respectively through the aforesaid slots, each leg having its terminal front end portion turned laterally as a pintle loosely received in the respective aperture of the side member to mount the bail for swinging vertically within the limits of the upright parts of the slots, and said pintles being axially shiftable in their respective side member apertures to enable transverse shifting of the bail when the legs thereof are alined with the transverse parts of said slots whereby to afford lock means for the bail when swung downwardly; and means for releasably retaining the bail in an upper position.

5. The invention defined in claim 4, including: handle means secured to the support frame and extending upwardly and rearwardly therefrom; means on the frame for supporting an attachable body; and releasable lock means on the handle means for engaging such attachable body.

6. A mobile unit of the class described, comprising: a transverse support frame having opposite depending fore-and-aft side members, said side members respectively having transversely coaxial apertures; wheels carrying the frame respectively adjacent to the side members and in covering relation respectively to said apertures; transverse depending plate means at the rear of the frame and secured thereto and having a pair of transversely spaced angular slots, each slot affording an upright part and a lower transverse part; a bail having a rear transverse bight rearwardly of the depending plate means and a pair of fore-and-aft legs extending forwardly respectively through the aforesaid slots and respectively laterally inwardly of the side members, each leg having its terminal front end portion turned laterally outwardly as a pintle loosely received in the respective aperture of the side member and extending toward the respective wheel to mount the bail for swinging vertically within the limits of the upright parts of the slots, and said pintles being axially shiftable in their respective side member apertures and the inner face of at least one of the wheels being recessed to accommodate the respective pintles when shifted to enable transverse shifting of the bail when the legs thereof are alined with the transverse parts of said slots whereby to afford lock means for the bail when swung downwardly; and means for releasably retaining the bail in an upper position.

References Cited in the file of this patent

UNITED STATES PATENTS

| | | |
|---|---|---|
| 499,212 | Coffield | June 13, 1893 |
| 957,406 | Bjorklund | May 10, 1910 |
| 2,502,138 | Foreit | Mar. 28, 1950 |
| 2,579,077 | Hubner | Dec. 18, 1951 |